Oct. 14, 1958 R. J. GORSKY 2,855,802
COUPLING FOR COMBINED HYDRODYNAMIC DRIVE DEVICE AND GEAR TRAIN
Filed March 31, 1954 2 Sheets-Sheet 1

INVENTOR
Rudolph J. Gorsky
BY T. L. Chisholm
ATTORNEY

Oct. 14, 1958 R. J. GORSKY 2,855,802
COUPLING FOR COMBINED HYDRODYNAMIC DRIVE DEVICE AND GEAR TRAIN
Filed March 31, 1954 2 Sheets-Sheet 2
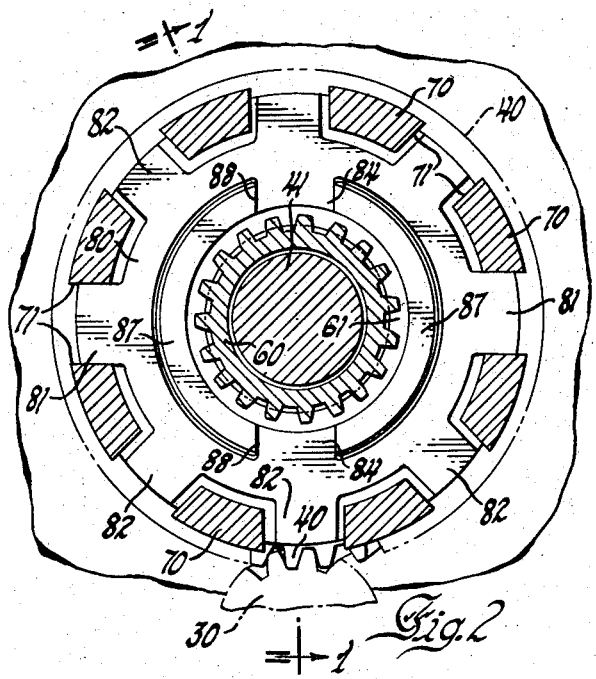
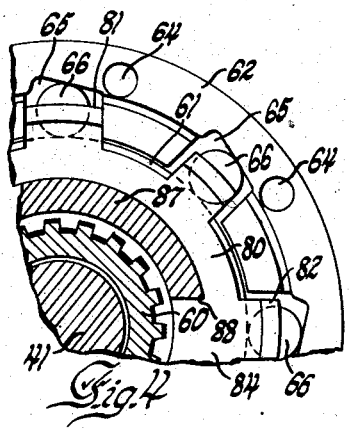
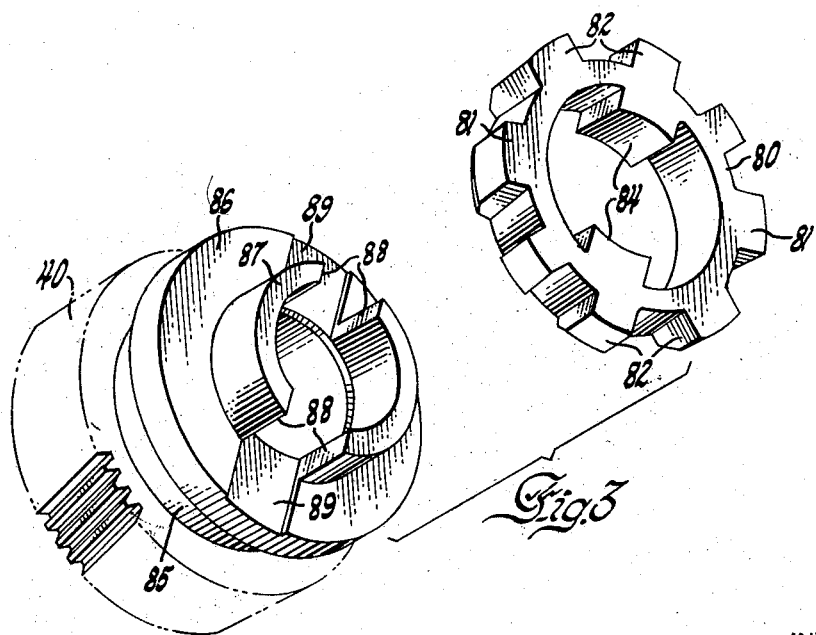
INVENTOR
Rudolph J Gorsky
BY
T. L. Chisholm
ATTORNEY

United States Patent Office 2,855,802
Patented Oct. 14, 1958

2,855,802

COUPLING FOR COMBINED HYDRODYNAMIC DRIVE DEVICE AND GEAR TRAIN

Rudolph J. Gorsky, Flint, Mich., assignor to General Motors Corporation, Detroit, Mich., a corporation of Delaware Application March 31, 1954, Serial No. 420,138

7 Claims. (Cl. 74—677)

This invention relates to improvements in torque converters and more particularly to improvements in such converters having associated therewith a planetary gear unit, the improvements of which are connected to various elements of the converter.

In the copending application of Oliver K. Kelley, Serial No. 317,951, filed October 31, 1952, for Hydrodynamic Torque Converters, disclosure has been made of a torque converter having an impeller or pump, first and second turbines, and reaction element or stator. Associated with this converter is a planetary gear unit, the ring gear of which is secured to the first turbine for rotation therewith; the planet carrier of which is secured to the second turbine for rotation therewith; and the sun gear, which is the reaction member, is operatively connected to the reaction element of the converter for rotation therewith. A one-way brake prevents reverse rotation of the converter reaction element and hence of the sun gear, but permits rotation of these two parts in the same direction as that of the converter pump. The carrier, which is connected to the second turbine, is also connected to the output shaft of the converter, and the sun gear of the planetary unit is mounted for rotation about and relative to the output shaft. The reaction element of the converter is mounted for rotation about a stationary sleeve which surrounds the output shaft. This shaft and the sleeve are concentric, but concentricity may vary during operation of the mechanism. It is therefore desirable that the connection between the sun gear and the reaction element be such as to compensate for lack of concentricity.

An object of the present invention is to provide a new and improved coupling between a sun gear rotatable about a shaft, and a reaction element rotatable about a sleeve substantially concentric with the shaft.

Another object of the invention is to provide a coupling which will compensate for lack of concentricity between the members about which the two coupling elements rotate.

A further object of the invention is to provide a coupling between a sun gear and a torque converter reaction element of such character that the parts of the coupling assist in retaining parts of the one-way brake which prevents reverse rotation of the reaction element and of the sun gear.

In carrying out the foregoing and other objects of this invention the reaction element of the converter, which is rotatable about a stationary sleeve, has a ring-like part secured to the hub thereof, which part is dimensioned to be in close rotatable fit with a solid ring splined or otherwise secured to the sleeve. The ring-like part fastened to the reaction element hub has a plurality of cam recesses cut in the inner surface thereof to receive rollers contacting the periphery of the ring splined to the sleeve and the cam formations. These rollers operate as a one-way brake to prevent rotation of the reaction element in one direction relative to the stationary sleeve but permit rotation in the opposite direction. The ring-like member secured to the reaction element hub has a plurality of axially extending lugs equally dimensioned and equally spaced apart. The inner surfaces of these lugs define a circle of one diameter while the outer surfaces thereof define a circle of another diameter which is of smaller diameter than the maximum diameter of this ring-like member.

Associated with these lugs is a ring-like yoke member, the outer diameter of which is smaller than the diameter of the inner circle of the lugs just described. The yoke has a plurality of peripheral lugs, two of which, diametrically oppositely disposed, are dimensioned for a close sliding fit between opposite pairs of the axially extending lugs. The minor peripheral lugs of this yoke have smaller dimensions also to fit between opposite pairs of axially extending lugs, but to remain out of contact with the edges of these axially extending lugs. The minor lugs, therefore, being positioned between axial lugs, serve to retain the rollers in their cam recesses. The yoke also has a pair of oppositely disposed inwardly extending lugs, the center line of which is substantially at right angles to the center line of the two major peripheral lugs. The sun gear has a tubular axial extension which is provided with opposite slots dimensioned to receive the inwardly extending yoke lugs with a close sliding fit. This sun gear tubular extension has an outer diameter smaller than the internal diameter of the yoke so that relative diametric sliding of these parts can be occasioned.

The coupling, provided by the axial lugs, the yoke with peripheral lugs and inwardly extending lugs, and the sun gear with slotted tubular extension, compensates for any lack of concentricity between the output shaft of the converter and the stationary sleeve.

Other features, objects and advantages of the invention will become apparent by reference to the following detailed description of the accompanying drawings, in which:

Fig. 2 is a partial section taken substantially on the line 2—2 of Fig. 1;

Fig. 3 is a collective perspective view of the yoke and the sun gear embodied in the invention; and Fig. 4 is a fragmentary section taken substantially on the line 4—4 of Fig. 1.

Figure 1:
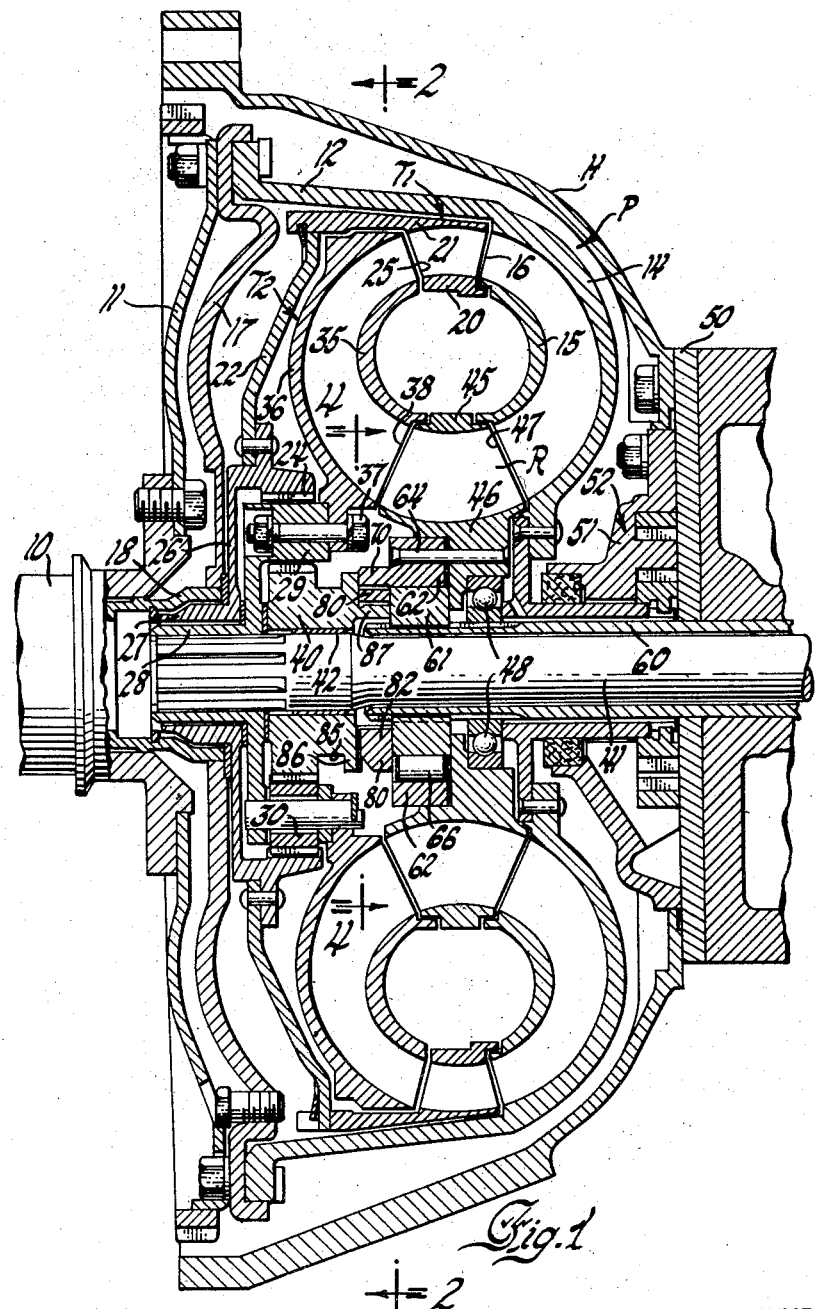
Fig. 1 is a section taken on radii of slight angularity, specifically radii indicated by the line 1—1 of Fig. 2.

Referring now to the drawings, 10 indicates a drive member such as the crank shaft of an internal combustion engine, to a flange of which is connected a disk-like member 11, in turn bolted or otherwise secured to an extension 12 of the outer shroud 14 of a torque converter impeller or pump P. This pump has an inner shroud 15 and blades 16. Also secured to the extension 12 and the disk 11 is a member 17 fastened to an irregular sleeve member 18 telescoped within the end of the driving member 10. The torque converter, in addition to the pump P, has a first turbine T1, a second turbine T2, and a reaction element or stator R. The first turbine T1 has an inner shroud 20 and an outer shroud 21 which is extended and secured to a disk member 22 in turn connected to ring gear 24 of a planetary gear unit. The first turbine T1 has blades 25 positioned between the inner and outer shrouds 20 and 21. The ring gear 24 has a radial disk portion 26 with a sleeve extension 27 rotatable about a similar sleeve part 28 of the planet carrier 29. Carrier 29 has a plurality of pinions 30 rotatably mounted thereon and meshing with the ring gear 24.

The second turbine T2 has an inner shroud 35 and an outer shroud 36 which is connected to the carrier 29 as by bolts 37. Blades 38 are mounted between the inner and outer shrouds 35 and 36.

The remaining member of the planetary gear unit comprises a sun gear 40 rotatable about an output shaft 41 splined to the carrier extension 28. A sleeve bearing 42 is positioned between the sun gear 40 and the output shaft 41.

Reaction element or stator R is made up of outer shroud 45 and inner shroud 46 which has an integral extension forming a hub to which other parts of the mechanism are secured in a manner to be described later. Blades 47 are mounted between the shrouds 45 and 46.

The torque converter is enclosed in a stationary housing H which is secured to a partition member 50 having fastened thereto casing 51 for a gear pump 52. This pump is used to supply fluid under pressure to operating parts of a transmission with which the converter may be associated and also to supply fluid for the working circuit of the converter. Inasmuch as this arrangement is well known, detailed illustration of the pump 52 and various supply lines therefrom have been omitted. Also secured to the housing H in any suitable fashion is a stationary sleeve 60 which surrounds a part of the output shaft 41 and is arranged to be coaxial or concentric therewith. The assembly including ball bearings 48 transmits axial thrust from reaction element R to the hub of impeller or pump P.

Splined to the sleeve 60 near the end thereof is a ring 61 which cooperates with a further ring-like member to provide parts of a one-way brake for the reaction element R. Ring-like member 62 is secured to the hub part of inner shroud 46 by rivets 64.

Referring to Fig. 4, it will be seen that the ring-like member 62 has a plurality of cam recesses 65 cut in the inner surface thereof. It will also be noted that the periphery of the ring 61 is shown as being in close proximity to the inner surface of the ring-like member 62. In actual practice these parts are so dimensioned that ring 61 serves as a bearing for member 62. Individual rollers 66 are located in each cam recess 65 to prevent relative rotation between rings 61 and 62 in one direction, but to permit free rotation thereof in the other direction. If desired, spring helper members may be associated with the rollers to assure their engagement between the cam surfaces of the recesses and the periphery of ring 61.

The ring-like member 62 has a plurality of axially extending lugs 70. The lugs 70 are equally dimensioned and equally spaced, and are positioned between the respective ends of the cam recesses 65. By reference to Fig. 2, it will be seen that the lugs 70 have side wall surfaces 71 which are parallel to side wall surfaces of adjacent lugs, thereby providing slideways with parallel walls. The inner surfaces of the lugs lie in a circle of one diameter while the outer surfaces or peripheries lie in a circle of larger diameter.

Use is made in this invention of a ring-like yoke member 80, the external diameter of which is materially smaller than the diameter of the circle defining the inner surfaces of lugs 70. The yoke 80 is provided with a pair of major lugs 81, oppositely disposed and of a width and shape as to provide parallel side walls which can be received between opposite pairs of lugs 70 with a close sliding fit. Yoke 80 is also provided with a plurality of minor lugs 82, considerably narrower than the major lugs 81, so that they may be received between pairs of lugs 70 without being brought into contact with the walls of these lugs as the yoke is moved in the slideways receiving the major lugs 81. Since both the major and minor lugs 81 and 82 respectively are received between lugs 70, it follows that they serve to retain the rollers 66 in the respective cam recesses 65; the other ends of the rollers 66 being restrained by hub 46. Thus accidental and undesirable displacement of these rollers is prevented.

Yoke 80 is also provided with a pair of oppositely disposed inwardly extending lugs 84 having parallel side walls as shown. The lugs 84 have a center line therethrough and through the axis of the output shaft 41 substantially at right angles to a similar line through the major lugs 81. The exact dimensions or width of the minor lugs 82 is a matter of choice, since for the purposes of this invention it is sufficient to fulfill the same if these lugs are of size capable to retain the rollers 66 in their recesses. All drive between the yoke and the ring member 62 occurs between the major lugs 81 and the axially extending lugs 70 with which they contact.

The sun gear 40 is formed with a hub part 85 having a collar 86 and a tubular extension 87. Extension 87 has an external diameter smaller than the internal diameter of yoke 80 and an internal diameter sufficiently large to surround the end of sleeve 60 with considerable clearance. Tubular extension 87 is provided with opposite slots defining side walls 88 in parallel disposition. In the process of cutting these slots in the tubular member the tool employed therefor may be continued into the collar 86, as shown at 89, to assure the absolute parallelism of the walls 88, to cause the chamfer or fillet produced by the milling cutter (at the intersection of the bottom with the sides of the slot) to be placed beyond the limits of the contacting surface of the mating lugs 84, and to provide extra depth of the slots to serve as oil passages. These walls are so spaced as to receive with a snug fit the parallel walls of the inwardly extending yoke lugs 84. Due to the difference in the external diameter of tubular extension 87 and the internal diameter of yoke 80, it is possible to move the extension 87 and sun gear 40 within limits along a diametric course of the yoke.

When the parts are assembled as shown in Fig. 1 it will be seen that the hub 46 of reaction element R has secured thereto the ring-like member 62 and member 62 has associated therewith the ring 61 which is splined to the sleeve 60. The rollers 66 are positioned in the respective cam recesses where they are retained by peripheral lugs 81 and 82 of yoke 80, which yoke is telescoped within the inner circle of lugs 70 as shown in Fig. 2. The yoke 80 is held in place by the collar 86 of the ring gear 40, with the tubular extension 87 telescoped within the yoke 80.

The operation of the torque converter and associated planetary gear unit has been described in detail in the copending application, before identified, but a brief description of this operation is as follows. When the impeller or pump P of the torque converter is rotated by the driving member 10 at a speed beyond stall speed, the liquid in the working circuit of the converter expelled by the pump P enters the first turbine T1, causing it to rotate in the same direction as the pump. Rotation of turbine T1 causes rotation of the ring gear 24 which imparts rotation to the pinions 30 and establishes reaction in the sun gear 40 since rotation of the pinions under the impetus of the ring gear tends to cause the sun gear to rotate in the reverse direction, which is prohibited by the one-way brake formed in part of rollers 66. With reaction thus established, the pinions 30 are compelled to walk around the sun gear, carrying the carrier 29 with them. This carrier 29 is splined directly to the output shaft so that the movement just described of the carrier causes rotation of the output shaft 41. The liquid discharged by the first turbine T1 continues through the second turbine T2 into the reaction element R which changes the direction of motion thereof to return it to the pump P. During initial stages of operation substantially all torque is transmitted by the first turbine T1 through the planetary gear unit to the output shaft, causing this shaft to rotate at a predetermined ratio slower than the speed of rotation of turbine T1. The liquid entering the reaction element R exerts a force on the blades thereof which would cause this element to rotate in the reverse direction were it not inhibited against such motion by the one-way brake previously described. Thus it will be seen that both the reaction element of the torque converter and the reaction gear member of the planetary unit are prevented from rotating in the reverse direction by the same one-way brake.

As the converter pump accelerates beyond a certain speed, the second turbine T2 shares with the first turbine in the transmission of torque and gradually assumes the entire torque transfer until the force tending to rotate the sun gear in the reverse direction is eliminated, which would permit the sun gear to idle or free wheel in the same direction of rotation as the planet carrier secured to turbine T2, if the sun gear was not restrained by reaction element R. Likewise a point is reached in the operation of the elements of the torque converter at which fluid discharged from the second turbine T2, instead of entering the reaction element R in a direction applying a reverse rotative force thereto, enters the reaction element in such direction as to cause it to rotate in the same direction as the turbines and pump of the converter. By proper blade shape in the various elements of the converter, free wheeling of the reaction element R can be made to occur at approximately the same speed of pump rotation as natural free wheeling of the sun gear will occur. Since these two elements, i. e., the sun gear and the reaction element R, are connected together or coupled in the manner described in detail hereinbefore, it will be obvious that they must and can free wheel only in unison. When this phase of operation of the converter occurs, it will be seen that the reaction element R, being secured to ring-like member 62, can rotate about the stationary sleeve 60, while the sun gear 40 can rotate relative to the output shaft 41, with the sleeve bearing 42 in place therebetween.

If the sleeve 60 and the output shaft 41 are not strictly coaxial or concentric, it is evident that strain would be imposed on parts of the mechanim. However, the coupling provided by the yoke member 80 and its peripheral lugs 81 and inwardly extending lugs 84 engaging the axial lugs 70 and the walls 88 of the slot in the tubular extension 87 respectively compensates for such lack of concentricity in the sleeve and output shaft within limits. Thus these two reaction members can rotate in unison even about axes out of coincidence.

It will be observed, particularly by reference to Fig. 2, that the major lugs 81 of yoke 80 may be engaged or received between any opposite pairs of axial lugs 70, and further it will be noted that all drive between the yoke and the lugs 70 occurs through the agency of the major lugs 81. It will therefore be evident that the minor lugs 82 serve solely to retain the rollers 66 in the cam recesses 65.

The invention can be modified beyond the illustrated embodiment and hence is to be limited only by the scope of the following claims.

What is claimed is:

1. A coupling for connecting two rotatable members in end-to-end relation and for compensating for misalignment of the axes of rotation of said members comprising a plurality of circularly arranged equally spaced equally dimensioned lugs extending axially from one end of one of said members, a ring-like yoke having a plurality of peripheral lugs, a major pair of diametrically opposite peripheral lugs being dimensioned for close sliding fit between any opposite pairs of axially extending lugs, the remaining minor peripheral lugs having smaller dimensions, said yoke having a pair of oppositely disposed inwardly extending lugs, the diametric center lines of said major lugs and inwardly extending lugs being substantially at right angles, and a tubular axial extension on one end of the other of said members telescoping within said yoke and having diametrically opposite slots receiving said inwardly extending lugs with a close sliding fit, said minor peripheral lugs being movable within the spaces between pairs of axially extending lugs when said yoke is moved diametrically relative to said axially extending lugs.

2. A coupling for connecting two rotatable members in end-to-end relation and for compensating for misalignment of the axes of rotation of said members comprising a plurality of circularly arranged equally spaced equally dimensioned lugs extending axially from one end of one of said members, a ring-like yoke having a plurality of peripheral lugs positioned in the spaces between said axially extending lugs, a major pair of diametrically opposite peripheral lugs being dimensioned for close sliding fit between any opposite pairs of axially extending lugs, the remaining minor peripheral lugs having smaller dimensions to prevent contact with said axially extending lugs during movement of said yoke diametrically relative to said axially extending lugs, said yoke having a pair of oppositely disposed inwardly extending lugs, the diametric center lines of said major lugs and inwardly extending lugs being substantially at right angles, and a tubular axial extension on one end of the other of said members telescoping within said yoke and having diametrically opposite slots receiving said inwardly extending lugs with a close sliding fit.

3. A coupling for connecting two rotatable members in end-to-end relation and for compensating for misalignment of the axes of rotation of said members comprising a plurality of circularly arranged equally spaced equally dimensioned lugs extending axially from one end of one of said members, a ring-like yoke telescoped within said ring of axial lugs and having its external diameter smaller than that of the inner circle of said axial lugs, said yoke having a plurality of peripheral lugs, a major pair of diametrically opposite peripheral lugs being dimensioned for close sliding fit between and opposite pairs of axially extending lugs, the remaining minor peripheral lugs having smaller dimensions, said yoke having a pair of oppositely disposed inwardly extending lugs, the diametric center lines of said major lugs and inwardly extending lugs being substantially at right angles, and a tubular axial extension on one end of the other of said members telescoped within said yoke and having its external diameter smaller than the internal diameter of said yoke, said tubular axial extension having diametrically opposite slots receiving said inwardly extending lugs with a close sliding fit, said minor peripheral lugs being movable within the spaces between pairs of axially extending lugs when said yoke is moved diametrically relative to said axially extending lugs.

4. A coupling for connecting two rotatable members in end-to-end relation and for compensating for misalignment of the axes of rotation of said members comprising a plurality of circularly arranged equally spaced equally dimensioned lugs extending axially from one end of one of said members, a ring-like yoke telescoped within said ring of axial lugs and having its external diameter smaller than that of the inner circle of said axial lugs, said yoke having a plurality of peripheral lugs positioned in the spaces between said axially extending lugs, a major pair of diametrically opposite peripheral lugs being dimensioned for close sliding fit between any opposite pairs of axially extending lugs, the remaining minor peripheral lugs having smaller dimensions to prevent contact with said axially extending lugs during moving of said yoke diametrically relative to said axially extending lugs, said yoke having a pair of oppositely disposed inwardly extending lugs, the diametric center lines of said major lugs and inwardly extending lugs being substantially at right angles, and a tubular axial extension on one end of the other of said members telescoped within said yoke and having its external diameter smaller than the internal diameter of said yoke, said tubular axial extension having diametrically opposite slots receiving said inwardly extending lugs with a close sliding fit.

5. In a torque converter having driving, driven and reaction elements, an output shaft, a stationary sleeve surrounding said shaft, a planetary gear set having a reaction member rotatable about said shaft, said reaction element being rotatably mounted on said sleeve, a one-way brake device preventing reverse rotation of said reaction element relative to said sleeve comprising a ring roller race held stationary by said sleeve, a ring secured to the hub of said reaction element surrounding said race and having a plurality of cam recesses in its inner surface, a roller in each cam recess with one end of each roller restrained by said reaction element hub, and means for connecting said reaction gear member to said reaction element comprising a plurality of circularly arranged equally spaced equally dimensioned lugs extending axially from said ring and located between the ends of said cam recesses, a ring-like yoke having a plurality of peripheral lugs positioned in the spaces between said axially extending lugs to retain said rollers in said cam recesses, a major pair of diametrically opposite peripheral lugs being dimensioned for close sliding fit between opposite any pairs of axially extending lugs, the remaining minor peripheral lugs having smaller dimensions, said yoke having a pair of oppositely disposed inwardly extending lugs, the diametric center lines of said major lugs and inwardly extending lugs being substantially at right angles, and a tubular axial extension on said gear reaction member telescoping within said yoke and having diametrically opposite slots receiving said inwardly extending lugs with a close sliding fit, said minor peripheral lugs being movable within the spaces between pairs of axially extending lugs when said yoke is moved diametrically relative to said axially extending lugs.

6. In a torque converter having driving, driven and reaction elements, an output shaft, a stationary sleeve surrounding said shaft, a planetary gear set having a reaction member rotatable about said shaft, said reaction element being rotatably mounted on said sleeve, a one-way brake device preventing reverse rotation of said reaction element relative to said sleeve comprising a ring roller race held stationary by said sleeve, a ring secured to the hub of said reaction element surrounding said race and having a plurality of cam recesses in its inner surface, a roller in each cam recess with one end of each roller restrained by said reaction element hub, and means for connecting said reaction gear member to said reaction element comprising a plurality of circularly arranged equally spaced equally dimensioned lugs extending axially from said ring and located between the ends of said cam recesses, a ring-like yoke telescoped within said ring of axial lugs and having its external diameter smaller than that of the inner circle of said axial lugs, said yoke having a plurality of peripheral lugs positioned in the spaces between said axially extending lugs to retain said rollers in said cam recesses, a major pair of diametrically opposite peripheral lugs being dimensioned for close sliding fit between any opposite pairs of axially extending lugs, the remaining minor peripheral lugs having smaller dimensions, said yoke having a pair of oppositely disposed inwardly extending lugs, the diametric center lines of said major lugs and inwardly extending lugs being substantially at right angles, and a tubular axial extension on said gear reaction member telescoping within said yoke and having its external diameter smaller than the internal diameter of said yoke, said tubular axial extension having diametrically opposite slots receiving said inwardly extending lugs with a close sliding fit, said minor peripheral lugs being movable within the spaces between pairs of axially extending lugs when said yoke is moved diametrically relative to said axially extending lugs.

7. In a torque converter having driving, driven and reaction elements, an output shaft, a stationary sleeve surrounding said shaft, a planetary gear set having a reaction member rotatable about said shaft, said reaction element being rotatably mounted on said sleeve, a one-way brake device preventing reverse rotation of said reaction element relative to said sleeve comprising a ring roller race held stationary by said sleeve, a ring secured to the hub of said reaction element surrounding said race and having a plurality of cam recesses in its inner surface, a roller in each cam recess with one end of each roller restrained by said reaction element hub, and means for connecting said reaction gear member to said reaction element comprising a plurality of circularly arranged equally spaced equally dimensioned lugs extending axially from said ring and located between the ends of said cam recesses, a ring-like yoke telescoped within said ring of axial lugs and having its external diameter smaller than that of the inner circle of said axial lugs, said yoke having a plurality of peripheral lugs positioned in the spaces between said axially extending lugs to retain said rollers in said cam recesses, a major pair of diametrically opposite peripheral lugs being dimensioned for close sliding fit between any opposite pairs of axially extending lugs, the remaining minor peripheral lugs having smaller dimensions to prevent contact with said axially extending lugs during movement of said yoke diametrically relative to said axially extending lugs, said yoke having a pair of oppositely disposed inwardly extending lugs, the diametric center lines of said major lugs and inwardly extending lugs being substantially at right angles, and a tubular axial extension on said gear reaction member telescoping within said yoke and having its external diameter smaller than the internal diameter of said yoke, said tubular axial extension having diametrically opposite slots receiving said inwardly extending lugs with a close sliding fit.

References Cited in the file of this patent

UNITED STATES PATENTS

| | | |
|---|---|---|
| 1,572,255 | Uhl | Feb. 9, 1926 |
| 1,731,151 | Royce | Oct. 8, 1929 |
| 2,023,018 | Hamilton | Dec. 3, 1935 |
| 2,372,817 | Dodge | Apr. 3, 1945 |
| 2,616,309 | Russell | Nov. 4, 1952 |

FOREIGN PATENTS

| | | |
|---|---|---|
| 697,431 | Great Britain | Sept. 23, 1953 |

UNITED STATES PATENT OFFICE
CERTIFICATE OF CORRECTION

Patent No. 2,855,802                                October 14, 1958

Rudolph J. Gorsky

It is hereby certified that error appears in the printed specification of the above numbered patent requiring correction and that the said Letters Patent should read as corrected below.

Column 7, line 16, after "between" insert -- any --; line 17, strike out "any".

Signed and sealed this 13th day of January 1959.

(SEAL)
Attest:
KARL H. AXLINE
Attesting Officer

ROBERT C. WATSON
Commissioner of Patents